US 6,728,688 B1

(12) United States Patent
Hirsch et al.

(10) Patent No.: US 6,728,688 B1
(45) Date of Patent: Apr. 27, 2004

(54) METHOD AND COMMUNICATION SYSTEM FOR HANDLING ALARMS USING A MANAGEMENT NETWORK HAVING A NUMBER OF MANAGEMENT LEVELS

(75) Inventors: Lucian Hirsch, München (DE); Alfred Schmidbauer, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/555,189

(22) PCT Filed: Nov. 2, 1998

(86) PCT No.: PCT/DE98/03195
§ 371 (c)(1),
(2), (4) Date: May 25, 2000

(87) PCT Pub. No.: WO99/29068
PCT Pub. Date: Jun. 10, 1999

(30) Foreign Application Priority Data

Nov. 27, 1997 (DE) .......................................... 197 52 614

(51) Int. Cl.⁷ .......................... G06F 17/00; G06F 17/20
(52) U.S. Cl. .......................... 706/11; 340/506; 341/101
(58) Field of Search .......................... 706/11; 340/506; 341/101

(56) References Cited

FOREIGN PATENT DOCUMENTS

| JP | 08-1213772 | 9/1996 |
| JP | 09-214510 | 12/1997 |
| WO | WO 96/20547 | 7/1996 |
| WO | WO 96/24899 | 8/1996 |

OTHER PUBLICATIONS

Nathan J. Muller; Improving Network Operations with Intelligent Agents; Jul. 1997; ACM; CCC1055–7148; 116–126.*
S. Hajela, "HP OEMF: Alarm Management in Telecommunications Networks", Hewlett–Packard Journal, vol. 47, No. 5, Oct. 1996, pp. 22–30.
ITU Recommendation X–710.
ITU Recommendation X–733.

* cited by examiner

Primary Examiner—Wilbert L. Starks, Jr.
Assistant Examiner—Joseph P. Hirl
(74) Attorney, Agent, or Firm—Staas & Halsey LLP

(57) ABSTRACT

Alarm data for active alarms is transmitted for alarm realignment between an agent on one management level and at least one manager on a next highest management level. The manager sends one or more request notifications to the agent for transmission of the alarm data, and correlation information for assigning the respective request to the notifications which are subsequently sent by the agent is received. This means that, in the management network, a number of alarm realignments can take place simultaneously between the agent and a number of managers or serially between the agent and an individual manager without observing the sequence of requested realignments.

21 Claims, 2 Drawing Sheets

METHOD AND COMMUNICATION SYSTEM FOR HANDLING ALARMS USING A MANAGEMENT NETWORK HAVING A NUMBER OF MANAGEMENT LEVELS

The present invention relates to a method and a corresponding communication system for handling alarms using a management network which has a number of management levels, the alarm data for active alarms being transmitted for alarm realignment between an agent on one management level and at least one manager on a next highest management level.

The principles of a management network, which are also called TMN (Telecommunications Management Network) principles, define a number of management levels for managing a communication system—for example a mobile communication system—, each level having a dual function. In the managing system, every level except for the bottom one has a manager function for the level situated below it. In the managed system, every level except for the top one has an agent function for the next highest level.

Fault management is an important part of TMN management. In principle, the agent plays the active role here by recognizing, in good time and accurately, faults on its own management level and transmitting them as alarms to the manager on the next highest level. The transmission of alarm data from the agent to the manager is not critical as long as the communication mechanism between these systems is not impaired. If the connection between the two management levels, that is to say between the agent and the manager, is no longer ensured for a particular time, the agent must temporarily store the alarms which have occurred during this interval to ensure that, after the possibility of communication has been restored, an overview of the currently active alarms—e.g. in the form of a list—is provided to the manager as quickly as possible, on the one hand, and, on the other hand, the manager can establish as complete an alarm history as possible both for the active and for the cleared alarms.

For this purpose, alarm realignment between the agent and the manager is carried out whenever a new connection is established after a connection has been terminated or after the agent or the manager has been initialized. All the alarm data for active alarms for which faults have not yet been cleared in the agent—which can be recognized from the fact that they are not identified as "cleared alarms"—can therefore be provided to the next highest management level in full and as quickly as possible.

PCT Patent Application Ser. No. 96/24899 discloses a method with one or more managers and an agent, in which the intention is to reduce the number of notifications produced by the agent. Depending on defined parameter values, particular notifications generated in the agent are filtered out by discriminators, with the result that they no longer reach the manager as "Event reports". Such discriminators do not reduce the processing load in the agent. The method therefore provides for the actual production of the notifications in the "managed system" to be controlled by the operator on the "managing system", i.e. the agent should really only generate those notifications which are relevant to the manager and are therefore to be transmitted subsequently as "Event reports" via the manager/agent interface. The notifications in the agent are produced on the basis of a "notification stop" attribute when the individual object instance is defined, with the result that transmission of the notifications is permitted or prevented depending on load.

The object of the invention is to provide a method and a communication system for handling alarms using a management network which has a number of management levels and optimizes alarm realignment between an agent and a number of mangers.

SUMMARY OF THE INVENTION

This object is achieved in accordance with the present invention in a method for handling alarms in a communication system using a management network having a number of management levels, wherein alarm data for active alarms is transmitted for parallel alarm realignments between an agent on a first management level and managers on a next highest management level, said method comprising the steps of:

transmitting from each of the managers to the agent at least one request having a request notification for transmission of alarm data; and transmitting from the agent to a respective manager a number of notifications having the requested alarm data along with at least one item of correlation information for assigning a respective request to the notifications.

This object is also achieved in accordance with the present invention in a communication system for handling alarms using a management network which has a number of management levels, the alarm data for active alarms being transmitted for parallel alarm realignments between an agent on one management level and a number of managers on a next highest management level, the communication system comprising:

a number of managers each having:
   a first transmitter for transmitting at least one request having a request notification for transmission of the alarm data, and
   a first receiver for receiving a number of notifications having the requested alarm data along with items of correlation information for assigning the respective request to notifications; and at least one agent having:
   a second transmitter for transmitting to the manager the notifications having the requested alarm data along with the items of correlation information, and
   a second receiver for receiving said transmissions from the manager.

The present invention is based on the alarm data for active alarms being transmitted for alarm realignment between an agent on one management level and at least one manager on a next highest management level. According to the present invention, the manager sends one or more request notifications to the agent for transmission of the alarm data, and correlation information for assigning the respective request to the notifications with the alarm data which are subsequently sent by the agent is received.

In the management network, the use of the correlation information according to the present invention means that a number of alarm realignments between the agent and one or more managers can take place simultaneously or serially. Parallel alarm handling results in better use of the transmission resources on the interface for the agent/manager relationship and allows the agent to provide the alarm data for active alarms more quickly for the next highest management level. The assignment on the basis of the correlation information provides the individual manager with the option, for both serial and parallel processes, of being able to assign the incoming responses from the agent with the alarm data—in response to a number of requests from the manager—explicitly to the requests—for example from various applications in the manager—even if the sequence is not observed. Requests sent in succession can overtake one another, for example if a packet network is being traversed between the agent and the manager. The agent can process a number of requests for realignment in parallel and, immediately thereafter, can send back the alarm data for realignment to the manager(s) without taking into account the sequence of the requests started and addressed to it.

A particular advantage of the present invention is that requests for the transmission of alarm data can be initiated by a number of managers in parallel and can be processed by the agent without affecting or interfering with one another. This is made possible, simply but effectively, by the correlation information. The notifications with the alarms on the communication path between the agent and the manager(s) can be allowed to overtake one another without corruptions or faults arising as a result. Furthermore, the present invention, characterized by the simultaneous transmission of the correlation information, allows the alarms transmitted on request for realignment to be distinguished from other alarms transmitted on the communication path—the "regular" alarms.

In an embodiment the manager sends back, in the request notification, a (first) item of correlation information for assigning the respective request to the notifications with the alarm data which are subsequently sent by the agent, and the agent sends back to the manager a respective notification for starting the alarm realignment, said notification containing the first item of correlation information for the respective request and a further item of correlation information for assigning to the respectively started realignment the notifications with the alarm data which are subsequently sent by the agent. By initiating and transmitting the two items of correlation information in separate notifications, the manager can assign the requests to the notifications with the alarm data.

In an embodiment the agent also sends, in the respective notifications with the alarm data, the item of correlation information for assigning the notifications to the respectively started realignment. This ensures that the alarm data for different realignments taking place simultaneously reaches the manager, which processes each of the requested alarms further, irrespective of the instant at which it was transmitted by the agent.

In an embodiment, the agent, after sending the notifications with the alarm data, sends a respective notification for ending the alarm realignment to the manager, said notification containing the item of correlation information for the respective request. On the basis of the incoming item of correlation information, the managers can explicitly recognize the end of the notification sequence which contains alarm data and is intended for them in each case.

In an embodiment the agent uses one or more filter functions, which can each be controlled by an assignable manager, with filter criteria for the notifications produced by the agent, said notifications being routed to the manager only if the filter criteria are satisfied. The joint use of the filter mechanism provided generally for EVENT REPORTING in the management network has the advantage that the same filter criteria can be taken as a basis for realignment alarms as for the other alarms with virtually no additional complexity. Otherwise, the manager would, specifically, have to define these filter criteria first and specify them in the request which is to be evaluated by the agent in order to send the desired active alarms with the alarm data to the manager.

In an embodiment, a number of request notifications with correlation information which can in each case be assigned to the requests are sent by at least two managers. In this case, the managers for sending the request notifications, preferably for alarm realignment, are formed by different network elements in the management network. In accordance with one particularly preferred embodiment, the managers comprise various network management centers, in which case an item of correlation information for assigning the request to the respective network management center is sent together with the request notification.

In an embodiment, a number of request notifications with correlation information which can in each case be assigned to the requests are sent by one manager. In accordance with a preferred embodiment, the manager sends the request notifications to different applications in a physical network element in the management network. The manager can be an operation and maintenance center or a network management center, each with various applications, and can send a respective item of correlation information for assigning the request to the respective application together with the request notification.

According to the present invention, the communication system, in which the alarm data for active alarms is transmitted for alarm realignment between an agent on one management level and at least one manager on a next highest management level, comprises elements in the manager for sending one or more request notifications to the agent for transmission of the alarm data, and elements in the manager for receiving correlation information for assigning the respective request to the notifications with the alarm data which are subsequently sent by the agent.

These and other features of the invention(s) will become clearer with reference to the following detailed description of the presently preferred embodiments and accompanied drawings.

DETAILED DESCRIPTION OF THE PRESENTLY PREFERRED EMBODIMENTS

Figure 1:
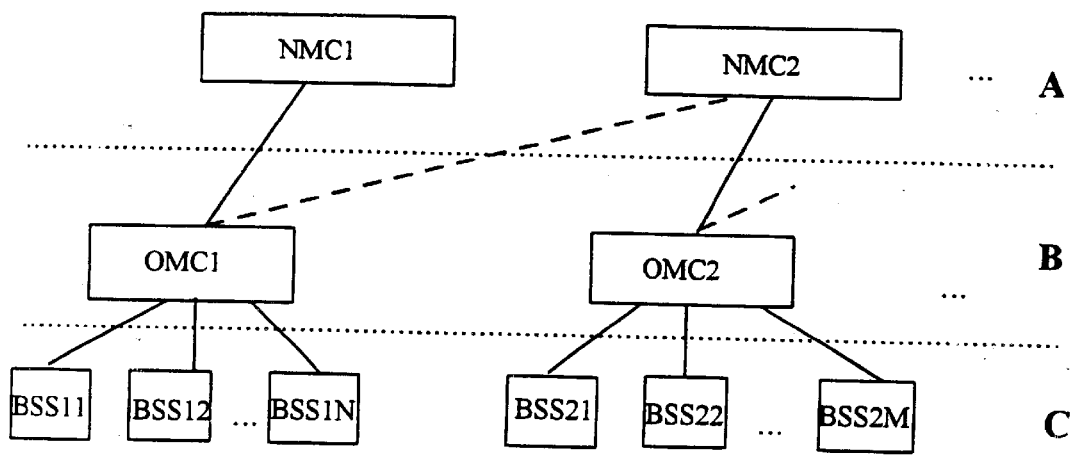
FIG. 1 shows the block diagram of a management network for a mobile communication system with an agent/manager relationship between an operation and maintenance center and one or more network management centers.

The illustrative embodiment describes the invention present using a TMN concept for the management of a mobile communication system which, by way of example, has network elements in a mobile radio network based on the GSM standard. However, the present invention is not restricted to mobile radio networks, but can be applied to any kind of telecommunications networks which use a TMN management network.

A mobile communication system is a hierarchically structured system of different network elements, in which the bottom stage of the hierarchy is formed by the mobile stations. These mobile stations communicate, via a radio interface, with radio stations which form the next level in the hierarchy and are called base stations. The base stations, which supply, for example, mobile stations in a radio range of a radio cell, are preferably combined to cover a relatively large radio area and are connected to superordinate network elements, the base station controllers. The base stations and base station controllers are part of a base station subsystem of the mobile communication system. The base station controllers communicate, via defined interfaces, with one or more switching centers, the mobile exchanges, which are also used, among other things, for crossing to other communication networks. The mobile exchanges form, together with a number of databases, the switching subsystem of the mobile communication system.

In addition to the above network elements, there are one or more operation and maintenance centers, which, among other things, are used to configure and monitor the network elements. In this regard, monitoring measures and configuration measures are usually controlled remotely from the operation and maintenance centers, which are normally arranged in the region of the mobile exchanges. An operation and maintenance center in this case communicates with a respective base station subsystem or switching subsystem via a defined interface. A further task of the operation and maintenance system is carrying out configuration management, which, in addition to fault management, represents one of five management function areas identified by the TMN principles. Configuration management defines a series of services which enable the user to change the structure and hence the behavior of a telecommunication network. These services always relate to instances of managed objects, which by and large form the network-specific management information base.

A managed object, in the configuration management sense, is a logical abstraction of a resource in the mobile communication system. In this case, a distinction is made between hardware-related managed objects, which describe manufacturer-specific realization of a function, and function-related managed objects, which each involve the abstraction of a set of functions which is independent of the manufacturer.

For managing the mobile communication system, the TMN principles define a number of levels, three of these levels being explained below in the present example with reference to FIGS. 1 and 2.

Figure 2:
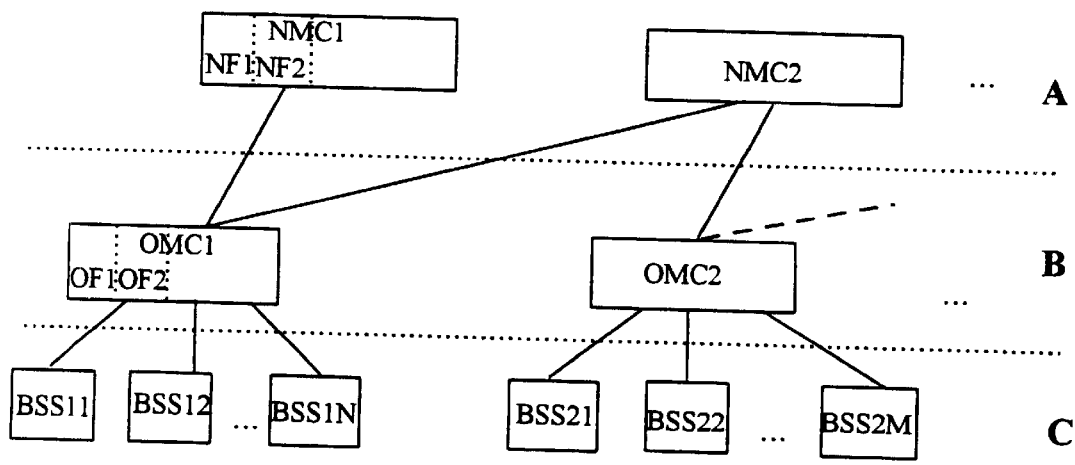
FIG. 2 shows the block diagram of the management network shown in FIG. 1 with an agent/manager relationship between a base station subsystem and an operation and maintenance center for implementing at least two applications for the base station subsystem.

FIGS. 1 and 2 each show three levels A, B and C in the management network, of which management level C contains the network element level having a number of base station subsystems BSS11, BSS12 . . . BSS1N and BSS21, BSS22 . . . BSS2M. Management level B identifies the network element management level in which operation and maintenance centers OMC1 and OMC2 each provide the manufacturer-specific management functions for individual subsystems, such as the operation and maintenance center OMC1 for the base station subsystems BSS11, BSS12 . . . BSS1N and the operation and maintenance center OMC2 for the base station subsystems BSS21, BSS22 . . . BSS2M in the present example. Management level A identifies the network management level in which network management centers NMC1 and NMC2 perform respective integrated management functions that are independent of the manufacturer. In this case, a number of network management centers can have access to the same network element on the next lowest management level B, in the present example the network management centers NMC1 and NMC2 on the next highest management level A can have access to the operation and maintenance center OMC1 on the next lowest management level B. Defined interfaces for transferring information are provided between the network elements on different management levels.

The difference between the illustrations shown in FIGS. 1 and 2 is that an agent/manager relationship for handling alarms exists, for one or more alarm realignments, in FIG. 1, between the operation and maintenance center OMC1 (agent) and a network management center NMC1 (manager) or a number of—physically separate—network management centers NMC1, NMC2 (managers), and in FIG. 2, between the base station subsystem BSS11 (agent) and two different applications OF1 and OF2 (managers) in the operation and maintenance center OMC1 or between the operation and maintenance center OMC1 (agent) and two different applications NF1 and NF2 (managers) in the network management center NMC1. To ensure an overview of the fault situation in the network management centers NMC1, NMC2 at all times, the operation and maintenance center OMC1—on the basis of faults occurring within the supervised base. station subsystems BSS11 . . . BSS1N, for example—provides stored alarm data for active alarms and sends it to both managers in parallel on request. This preferably occurs after a connection has been terminated or after the agent or the manager has been initialized. Similarly, a number of requests can also be addressed to the agent, e.g. the operation and maintenance center OMC1, in succession by an individual manager, e.g. the network management center NMC1. FIG. 1 shows the structure for alarm realignment requests which, in accordance with the present invention, are transmitted a number of times and, in the present example, take place in parallel between the management level B, which contains the agent in the form of the operation and maintenance center OMC1, and the next highest management level A, in which the managers are formed by at least two network management centers NMC1, NMC2.

To ensure an overview of the fault situation at all times in management level B as well, e.g. in the operation and maintenance center OMC1, the base station subsystem BSS11—on the basis of faults occurring a within the supervised base stations and base station controllers, for example—provides the stored alarm data for active alarms and sends it, in parallel, to at least two managers in the operation and maintenance center OMC1 in the form of the different applications OF1 and OF2, which are both implemented by one and the same physical element OMC1. This likewise occurs preferably after a connection has been terminated or after the agent or the manager has been initialized. Requests initiated a number of times by an individual manager, e.g. the operation and maintenance center OMC1, can also be transmitted serially to the agent, e.g. the base station subsystem BSS11. As an alternative or in addition, an agent/manager relationship can also exist between the operation and maintenance center OMC1 (an agent) and the network management center NMC1 (a manager) for serial interchange of requests and alarm data or for parallel interchange of requests and alarm data for at least two different applications NF1 and NF2 (two managers) in the network management center NMC1. FIG. 2 shows the structure for alarm realignments, taking place in parallel according to the present invention, between management level B, which contains the managers in the form of applications OF1 and OF2, and the next lowest management level C, which contains the agent.

As soon as an internal interface which has failed on management level C is operational again, the alarm realignment, also called realignment procedure or realignment method, is started at the request of the manager/managers. For this, in the present example, the alarm realignment is first started between the base station subsystem, e.g. BSS11, and the applications OF1, OF2 in the operation and maintenance center OMC1, in parallel, and is then continued between the operation and maintenance center OMC1 and the superordinate network management centers NMC1, NMC2 in parallel. At the end of these procedures, the fault situation both in the OMC and also in the NMC is updated again. The realignment method can, of course, be restricted to updating the alarm data between the agent and the managers on two immediately adjacent management levels, e.g. level B and level A.

Figure 3:
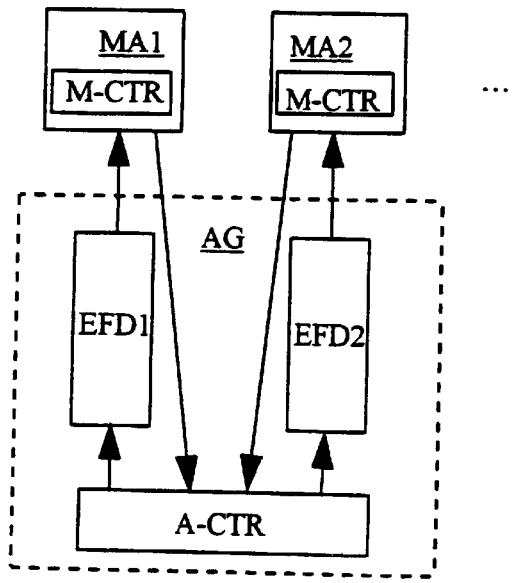
FIG. 3 shows the block diagram of the agent and the manager for handling the alarms for alarm realignments taking place in parallel or serially.

FIG. 3 shows a schematic illustration of the structure of the agent AG and the managers MA1, MA2 with the elements necessary for carrying out realignment procedures performed simultaneously—in the case of two or more managers—or serially—in the case of only one manager. Each manager MA1, MA2 and agent AG has a control element M-CTR and A-CTR, respectively, which can generate and evaluate the notifications for the alarm realignment. They also have transmission/reception elements (not shown in more detail) for transmitting and receiving the notifications, and memory elements for storing the alarm data and other useful information and signaling information. In this arrangement, the control elements M-CTR in the managers MA1, MA2 insert an item of correlation information, which is used for assigning the request to subsequently sent notifications, into the respective request notification for transmission of the alarm data by the agent, said item of correlation information being explicit and prompting transmission to the agent. The control element A-CTR in the agent AG receives the notification with the item of correlation information, evaluates it and starts realignment in respect of the managers by sending a respective notification with a further item of correlation information for assigning the notifications (alarm notifications) subsequently sent by the agent for the respectively started realignment to the next highest management level. The further item of correlation information is also explicit. The use of the correlation information allows realignments carried out simultaneously or serially to be explicitly assigned to a number of managers or to an individual manager, which optimizes the alarm realignment in terms of resource utilization, duration and flexibility in the communication system.

As an option, a number of filter functions EFD1, EFD2 (Event Forwarding Discriminators), which can each be assigned to the managers MA1, MA2 and can be controlled by them, with filter criteria for the notifications produced by the agent AG can also be used in the agent AG, so that the notifications with the alarm data are routed to the managers MA1, MA2 only if the filter criteria are satisfied. The manager's control element M-CTR is able to set up and delete such filter functions in the agent AG and to define the filter criteria in order to be able to control the notification flow on the basis of its individual requirements. The case can therefore arise in which the filter function setting differs from manager to manager, so that the simultaneously performed realignment procedures handle alarms with different contents using associated alarm data.

Figure 4:
FIG. 4 shows the notification flow between the agent and the manager.
Figure 4:
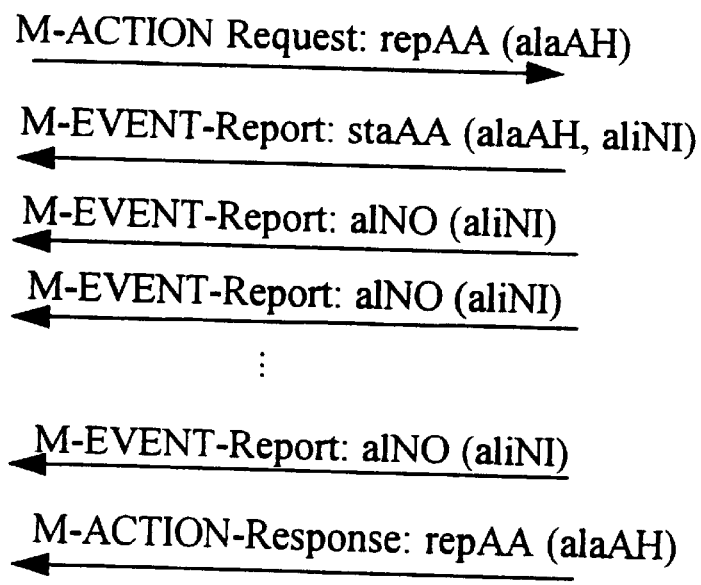

FIG. 4 shows the notification flow between an agent AG—the operation and maintenance center OMC1 in the example shown in FIG. 1 or the base station subsystem BSS11 in the example shown in FIG. 2—and the manager MA1, MA2—the various network management centers NMC1, NMC2 in the example shown in FIG. 1 or the various applications OF1, OF2 in the example shown in FIG. 2. The notification flow occurs preferably using a standardized M-EVENT-REPORT notification embedded in an M-ACTION request initiated at the start and in an M-ACTION response initiated at the end. These are generic CMISE-standardized (Common Management Information Service Element) procedures defined on the basis of ITU-T X.710. ITU-T X.733 defines the content of a standardized alarm transmission (alarm report) performed in accordance with the M-EVENT-REPORT services. According to the present invention, the correlation information is entered in the notifications or in particular notification fields. The example in FIG. 4 shows the notification flow using individual notifications only, these being transmitted in parallel between the agent AG and the managers MA1, MA2 or serially between the agent AG and the individual manager MA1.

As soon as communication is restored between the manager MA1, MA2 and the agent AG after the connection is interrupted, each manager MA1, MA2 sends the M-ACTION request with a request notification repAA (report Active Alarms) for transmission of the alarm data. Preferably, an item of correlation information alaAH (alarm Alignment Handle)—in the defined notification field "actionInformation", for example—defined by the manager MA1, MA2 is sent as well, this item of correlation information identifying direct assignment of the current M-ACTION request to all subsequent agent notifications. Consequently, with a number of managers, the current request can also be assigned to the relevant manager, so that the managers' parallel realignments can be initiated, carried out and ended independently of one another. Following evaluation of the M-ACTION request received, the agent AG starts alarm realignment by producing a notification staAA (start Alarm Alignment) and inserting a further item of correlation information aliNI (alignment Notification Id) into this notification. The additional item of correlation information aliNI defined by the agent AG allows subsequent alarms to be directly correlated to the respectively started alarm realignment. For this, the item of correlation information alaAH is likewise contained in a notification field. The item of correlation information aliNI is, by way of example, entered in the standardized notification field "notification Identifier" in the notification staAA. The two items of information alaAH, aliNI are transmitted together in the notification staAA by the agent AG to the managers MA1, MA2. This allows "alignment-related" M-EVENT-REPORT notifications for different M-ACTION requests to be distinguished from one another, and also from regular M-EVENT-REPORT notifications which have nothing to do with realignment. The reason for this is that an alignment procedure does not necessarily stop other M-EVENT-REPORT notifications which spontaneously arise during the alignment procedure and are sent to the manager(s).

The item of correlation information alaAH sent together with the request notification repAA for the M-ACTION request can be used to correlate the subsequent notifications staAA and repAA directly, because they likewise contain the item of correlation information alaAH. The notifications alNO are directly correlated to the notification staAA by means of the item of correlation information aliNI. The manager can correlate the request notification repAA to the subsequent notifications alNO indirectly using the two items of correlation information alaAH and aliNI contained in the notification staAA.

Following the start of the alarm realignment, the alarms are successively transmitted with the associated alarm data in successive notifications alNO (alarm notification) using the M-EVENT-REPORT service. In this context, the individual notifications alNO each have the item of correlation information aliNI—in the defined notification field "correlated Notifications", for example. After the last M-EVENT-REPORT notification for the alarm realignment, the agent AG generates the M-ACTION response for the notification repAA (report Active Alarms), which contains the item of correlation information al&AH for explicitly identifying the respective request from the manager MA1, MA2. By evaluating this item of correlation information, each manager MA1, MA2 can easily recognize the end of its initiated M-ACTION request and can assign the incoming alarm data to the requests. For the case in which no active alarms are stored at the instant of the M-ACTION request, the agent initiates the M-ACTION response immediately after the notification staAA is sent. The items of correlation information alaAH, aliNI for explicitly assigning a number of requests—for possible simultaneous realignments, to a number of managers, or for serial realignments, to an individual manager—are nevertheless generated by the elements involved in the agent/manager relationship and are sent in the notifications repAA, staAA. Even if the example described in relation to FIG. 4 relates to parallel realignments for a number of managers, the notification flow can, of course, be applied to a number of requests triggered in succession by an individual manager, with the advantage that the explicit assignment using the correlation information provides the individual manager with the option of being able to assign the incoming responses from the agent with the alarm data explicitly to the requests—for example from different applications in the manager—even if the sequence is not observed. Requests sent in succession can possibly overtake one another, for example if a packet network is traversed between the agent and the manager.

Although modifications and changes may be suggested by those of ordinary skill in the art, it is the intention of the inventors to embody within the patent warranted hereon all changes and modifications as reasonably and properly come within the scope of their contribution to the art.

What is claimed is:

1. A method for handling alarms in a communication system using a management network having a number of management levels, wherein alarm data for active alarms is transmitted for parallel alarm realignments between an agent on a first management level and managers on a next highest management level, said method comprising the steps of:
    transmitting from each of the managers to the agent at least one request having a request notification for transmission of alarm data; and
    transmitting from the agent to a respective manager a number of notifications having the requested alarm data along with at least one item of correlation information for assigning a respective request to the notifications.

2. The method as claimed in claim 1,
    wherein the manager transmits, in the request notification, a first item of correlation information for assigning the respective request to the notifications having the alarm data which are subsequently transmitted by the agent; and
    wherein the agent transmits to the manager a notification for starting the alarm realignment, said notification containing a second item of correlation information for the respective request and a third item of correlation information for assigning to the respectively started realignment the notifications having the alarm data which are subsequently transmitted by the agent.

3. The method as claimed in claim 1, wherein the agent also transmits to the manager, in the respective notifications having the alarm data, a further item of correlation information for assigning the notifications to the respectively started realignment.

4. The method as claimed in claim 1, further comprising the steps of:
    after transmitting the notifications with the alarm data, transmitting from the agent to the manager a further respective notification for ending the alarm realignment, said further notification containing a further item of correlation information for the respective request.

5. The method as claimed in claim 1, further comprising the steps of:
    using in the agent at least one filter function with filter criteria for the notifications produced by the agent, said notifications being controlled by an assignable manager and being routed to a manager only if the filter criteria are satisfied.

6. The method as claimed in claim 1, wherein at least two managers transmit a number of request notifications with an item of correlation information which can in each case be assigned to the requests.

7. The method as claimed in claims 6, wherein the managers are formed by different network elements in the management network.

8. The method as claimed in claim 6, wherein the managers are formed by various network management centers; and wherein the respective item of correlation information for assigning the request to the respective network management center is sent in the request notification.

9. The method as claimed in claim 1, wherein one manager transmits a number of request notifications with the item of correlation information, said item of correlation information being assignable in each case to the requests.

10. The method as claimed in claim 9, wherein the manager transmits the request notifications for different applications.

11. The method as claimed in claim 9, wherein the manager is formed by an operation and maintenance center having various applications; and wherein the respective item of correlation information for assigning the request to the respective application is transmitted in the request notification to a base station subsystem.

12. The method as claimed in claim 9, wherein the manager is formed by a network management center having various applications; and wherein the respective item of correlation information for assigning the request to the respective application is transmitted in the request notification to an operation and maintenance center.

13. A communication system for handling alarms using a management network which has a number of management levels, the alarm data for active alarms being transmitted for parallel alarm realignments between an agent on one management level and a number of managers on a next highest management level, the communication system comprising:
    a number of managers each having:
        a first transmitter for transmitting at least one request having a request notification for transmission of the alarm data, and
        a first receiver for receiving a number of notifications having the requested alarm data along with items of correlation information for assigning the respective request to notifications; and
    at least one agent having:
        a second transmitter for transmitting to the manager the notifications having the requested alarm data along with the items of correlation information, and
        a second receiver for receiving said transmissions from the manager.

14. The communication system as claimed in claim 13,
wherein the request notification comprises a first item of
correlation information for assigning the respective
request to the notifications having the alarm data which
are subsequently received from the agent; and wherein the second transmitter in the agent is further for
transmitting to the managers a notification for starting
the alarm realignment, said notification containing a
second item of correlation information for the respective request and a third item of correlation information
for assigning to the respectively started realignment the
notifications having the alarm data which are subsequently transmitted by the agent.

15. The communication system as claimed in claim 13, further comprising:

at least two managers for transmitting a number of request notifications having correlation information which can in each case be assigned to the requests.

16. The communication system as claimed in claim 15, wherein said managers for transmitting the request notifications are different network elements.

17. The communication system as claimed in claim 15, wherein the managers for transmitting the request notifications are network management centers.

18. The communication system as claimed in claim 13, wherein at least one of said managers is provided for sending a number of request notifications having correlation information which can in each case be assigned to the requests.

19. The communication system as claimed in claim 18, wherein at least one of said manager is provided for sending request notifications for different applications.

20. The communication system as claimed in claim 18, further comprising:

an operation and maintenance center in a form of a physical network element having various applications, said operation and maintenance center for transmitting to a base station subsystem items of correlation information for assigning a request to a respective application in a request notification.

21. The communication system as claimed in claim 18, further comprising:

a network management center in a form of a physical network element having various applications, said network management center for transmitting to an operation and maintenance center items of correlation information for assigning a request to a respective application in a request notification.

* * * * *

UNITED STATES PATENT AND TRADEMARK OFFICE
CERTIFICATE OF CORRECTION

PATENT NO.    : 6,728,688 B1
DATED         : April 27, 2004
INVENTOR(S)   : Lucian Hirsch et al.

It is certified that error appears in the above-identified patent and that said Letters Patent is hereby corrected as shown below:

Title page,
Item [30], Foreign Application Priority Data, change "197 52 614" to -- 197 52 614.4 --.

Column 2,
Line 5, move heading "SUMMARY OF THE INVENTION" to column 1, between lines 65 and 66.

Column 3,
Lines 22, 36 and 52, after "embodiment", insert -- , --.

Column 4,
Line 54, before "invention" insert -- present --.
Line 55, before "using" delete "present".

Column 6,
Line 16, after "base" delete ".".
Line 36, after "occurring" delete "a".

Column 9,
Line 5, change "al&AH" to -- alaAH --.

Column 10,
Line 21, change "claims" to -- claim --.

Signed and Sealed this

Seventh Day of September, 2004

JON W. DUDAS
*Director of the United States Patent and Trademark Office*